United States Patent
Shibahara

(10) Patent No.: US 9,727,529 B2
(45) Date of Patent: Aug. 8, 2017

(54) CALCULATION DEVICE AND CALCULATION METHOD FOR DERIVING SOLUTIONS OF SYSTEM OF LINEAR EQUATIONS AND PROGRAM THAT IS APPLIED TO THE SAME

(71) Applicant: Murata Manufacturing Co., Ltd., Kyoto (JP)

(72) Inventor: Teruhisa Shibahara, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 41 days.

(21) Appl. No.: 14/748,420

(22) Filed: Jun. 24, 2015

(65) Prior Publication Data

US 2015/0293883 A1  Oct. 15, 2015

Related U.S. Application Data

(63) Continuation of application No. PCT/JP2013/084659, filed on Dec. 25, 2013.

(30) Foreign Application Priority Data

Dec. 28, 2012 (JP) .................. 2012-287694

(51) Int. Cl.
G06F 17/10 (2006.01)
G06F 17/12 (2006.01)
G06F 17/16 (2006.01)

(52) U.S. Cl.
CPC .............. *G06F 17/12* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 5,604,911 A | | 2/1997 | Ushiro |
| 6,154,716 A | * | 11/2000 | Lee .................... G06F 17/5036 703/14 |
| 2002/0065664 A1 | * | 5/2002 | Witzgall .............. G06K 9/0057 704/500 |

FOREIGN PATENT DOCUMENTS

JP   H05-81310 A   4/1993

OTHER PUBLICATIONS

International Search Report issued in Application No. PCT/JP2013/084659 dated Feb. 10, 2014.

(Continued)

*Primary Examiner* — Michael D Yaary
(74) *Attorney, Agent, or Firm* — Pearne & Gordon LLP

(57) ABSTRACT

A calculation device for deriving solutions of a system of linear equations, which realizes a solution of the system of linear equations using an iterative method belonging to a Krylov subspace method, includes a plurality of arithmetic units. In the calculation device, a vector sequence $x_k$ (k is a natural number containing 0) approximating to the solutions of the system of linear equations is formed by a plurality of components in accordance with an order of the vector sequence $x_k$, and when the vector sequence $x_k$ is divided into a plurality of different regions corresponding to the plurality of components and the respective arithmetic units are caused to execute arithmetic processings corresponding to the plurality of different regions in parallel in iterative computation of causing the vector sequence $x_k$ to approximate to the solutions, a preconditioned matrix that is used in the iterative computation is a diagonal matrix.

8 Claims, 6 Drawing Sheets

(56) References Cited

OTHER PUBLICATIONS

Written Opinion issued in Application No. PCT/JP2013/084659 dated Feb. 10, 2014.
Kazuo Kashiyama et al., "Zoku Yugen Yosoho ni yoru Nagare no Simulation", 1st edition, Springer Japan Kabushiki Kaisha, Aug. 23, 2008.
Kenichiro Kusaba et al., "Performance estimation of MRTR method on PC with multicores" The Japan Society of Mechanical Engineers, Oct. 2009.
Kuniyoshi Abe et al., "MRTR Method: An Iterative Method Based on the Three-Term Recurrence Formula of CG-Type for Nonsymmetric Matrix" The Japan Society for Industrial and Applied Mathematics vol. 7, No. 1, 1997.

* cited by examiner

CALCULATION DEVICE AND CALCULATION METHOD FOR DERIVING SOLUTIONS OF SYSTEM OF LINEAR EQUATIONS AND PROGRAM THAT IS APPLIED TO THE SAME

BACKGROUND OF THE INVENTION

Field

The present disclosure relates to a calculation device and a calculation method for deriving solutions of a system of linear equations and a program that is applied to the same, in particular, relates to a calculation device and a calculation method for deriving solutions of a system of linear equations, which perform parallel processing by a plurality of arithmetic units, and a program that is applied to the same.

Background Art

In recent years, a device to which a technique of what-is-called industrial mathematics is applied, such as a simulation device using a finite element method, for example, has been increasingly required to solve a large-scale system of linear equations using a computer.

Methods for solving the large-scale system of linear equations are classified into a direct method and an iterative method broadly.

The direct method is a method in which unknowns of a system of linear equations are calculated one by one and includes a method using what-is-called LU factorization as a representative. On the other hand, the iterative method is a method in which a provisional solution vector is caused to approximate to true solutions using recurrence formulae. The direct method can reach solutions reliably with determined computation steps whereas, in the iterative method, a computation amount required to reach solutions cannot be predicted.

BRIEF SUMMARY

According to examination by the present inventor, a coefficient matrix A in a large-scale system of linear equations Ax=b as a solution-finding target is a sparse matrix in many cases in a field in which a technique of the industrial mathematics is applied, including a system of linear equations appearing in a simulation method using the finite element method, for example. In this case, the direct method requires a memory having a capacity proportional to the squared dimension number of the coefficient matrix whereas the iterative method may only requires a memory having a capacity proportional to the dimension number of the coefficient matrix. Accordingly, when an extremely large-scale system of linear equations is handled, usage of the iterative method is advantageous and it is considered that only the iterative method can be used in most cases practically.

As the iterative method that is used, there are iterative methods belonging to a what-is-called Krylov subspace method. The iterative methods belonging to the Krylov subspace method include a conjugate gradient method, a conjugate residual method, a bi-conjugate gradient method, a squared conjugate gradient method, a generalized conjugate residual method, a generalized minimal residual method, and an iterative method based on the three-term recurrence formula (MRTR) method. The Krylov subspace method has the significance that approximation to solutions can be achieved by the number of times of iteration much smaller than those of other iterative methods.

Further, the required number of times of iteration with the iterative method belonging to the Krylov subspace method tends to be reduced by taking a preconditioned matrix $M^{-1}$ satisfying $M^{-1} \cong A^{-1}$ into recurrence formulae. For this reason, the preconditioned matrix $M^{-1}$ is taken into the recurrence formula in some cases. A method for taking the preconditioned matrix $M^{-1}$ into the recurrence formulae includes a method using, as a preconditioned matrix, $(LU)^{-1}$, that is, $U^{-1}L^{-1}$ by computing a lower triangular matrix L and an upper triangular matrix U that satisfy $A \cong LU$ by what-is-called incomplete LU factorization.

The incomplete LU factorization is a computation method for deriving L and U so as to satisfy $A \cong LU$ under a constraint that L and U have no nonzero element only where A has a nonzero element.

Usage of $U^{-1}L^{-1}$ as the preconditioned matrix does not mean usage of a product of $U^{-1}$ and $L^{-1}$ derived actually. This is because actual derivation of $U^{-1}$ and $L^{-1}$ requires a huge computation amount and a huge memory capacity because U and L are sparse matrices but $U^{-1}$ and $L^{-1}$ are dense matrices, and therefore an advantage using the iterative method will disappear. In practice, U and L are computed in advance and they are used in the following method. To be specific, an operation of making a preconditioned matrix act on a vector is performed in the recurrence formulae. This operation is an operation of making $L^{-1}$ act on the vector, and then, making $U^{-1}$ act on a result of this. That is to say, the operation of making $L^{-1}$ act on the vector can be realized by an operation of deriving a linear equation using L as a coefficient matrix by a forward substitution method and the operation of making $U^{-1}$ act on the vector can be realized by an operation of deriving a linear equation using U as a coefficient matrix by a backward substitution.

According to a further examination by the present inventors, the method using, as the preconditioned matrix, $U^{-1}L^{-1}$ with usage of L and U provided by the incomplete LU factorization is very effective to reduce number of times of iteration but has a tendency of being unsuitable to parallel computation.

This is because the recurrence formulae include the operation of deriving the linear equation using L as the coefficient matrix by the forward substitution. The forward substitution is a process of settling vector components in the order from top and therefore, it tends to be very difficult to make parallel computation for a plurality of sites in the vector. In addition, the recurrence formulae include the operation of deriving the linear equation using U as the coefficient matrix by the backward substitution. The backward substitution is a process of settling vector components in the order from bottom and it tends to be very difficult to make parallel computation for a plurality of sites in the vector. That is to say, the method using $U^{-1}L^{-1}$ as the preconditioned matrix includes arithmetic processes of the forward substitution and the backward substitution with strict constraints in the computation order in the vector. Accordingly, it tends to be very difficult to apply parallel computation by a what-is-called vector computing method to the method using $U^{-1}L^{-1}$ as the preconditioned matrix.

Therefore, the method using $U^{-1}L^{-1}$ as the preconditioned matrix has a problem that it is difficult to speed up the arithmetic processing by parallelization. Particularly in recent years, in consideration of the present situation where parallel computation by a multicore central processing unit (CPU) or a graphics processing unit (GPU) is desired, this is the most significant problem to be solved.

The present disclosure has been made in view of the above-mentioned examinations and provides a calculation device and a calculation method for deriving solutions of a system of linear equations, which are capable of realizing a high-speed solution of the system of linear equations by parallel computation with a simple configuration, and a program that is applied thereto.

In order to achieve the above-mentioned object, according to a first aspect of the disclosure, a calculation device for deriving solutions of a system of linear equations, which realizes a solution of the system of linear equations using an iterative method belonging to a Krylov subspace method, the device including a plurality of arithmetic units, wherein a vector sequence $x_k$ (k is a natural number containing 0) approximating to the solutions of the system of linear equations is formed by a plurality of components in accordance with an order of the vector sequence $x_k$, and when the vector sequence $x_k$ is divided into a plurality of different regions corresponding to the respective plurality of components and the respective arithmetic units are caused to execute arithmetic processings corresponding to the plurality of different regions in parallel in iterative computation of causing the vector sequence $x_k$ to approximate to the solutions, a preconditioned matrix that is used in the iterative computation is a diagonal matrix.

With this configuration, the preconditioned matrix that is used in the iterative computation is the diagonal matrix. Therefore, the necessity to use the forward substitution or the backward substitution in a computation operation of making the preconditioned matrix act on a vector is eliminated. Further, when a vector (hereinafter, referred to as preconditioning vector) formed by aligning diagonal components of the preconditioned matrix as the diagonal matrix is prepared, the arithmetic process of making the preconditioned matrix act on an operated vector can be realized by computing products of respective corresponding components of the preconditioning vector and the operated vector and aligning the obtained products as a vector of a computation result. The computation of the products of the respective corresponding components of the preconditioning vector and the operated vector can be executed independently for the individual components. Therefore, parallel computation can be executed by a simple vector computing method. The "simple vector computing method" is a computation method in which the vector as a computation target is divided into a plurality of regions and computation for the different regions is performed by different arithmetic units in parallel. The arithmetic units are logic circuits capable of performing four arithmetic operations and operating with electric power.

In the calculation device according to a second aspect of the disclosure, the plurality of arithmetic units may be a combination of a plurality of cores provided in one multi-core CPU, a combination of a plurality of cores provided in one GPU, a combination of a plurality of CPUs, a combination of a plurality of GPUs, a combination of a CPU and a GPU, or a combination of a plurality of computers.

In this configuration, the structure using the plurality of cores in one CPU and the structure using the plurality of cores in one GPU both of which can share a memory, enables time taken for data transfer to be shorter easily. Therefore, it is said that the structures are advantageous to the high-speed arithmetic operation. On the other hand, the structure in which a parallel arithmetic operation is performed using the plurality of CPUs, the plurality of GPUs, or the plurality of computers can be employed. These structures have advantages that larger-scale system of equations can be handled and the degree of parallelism can be further increased. It is needless to say that these structures can be combined with a high degree of freedom in accordance with necessary performance and the types and the number of arithmetic units capable of employing them actually.

In the calculation device according to a third aspect of the disclosure, the iterative method may be a preconditioned conjugate gradient method using a diagonal matrix $M^{-1}$ as the preconditioned matrix, and when a solution vector x of a system of linear equations Ax=b constituted by a known matrix A and a known vector b is derived, the vector sequence $x_k$ may be caused to approximate to the solution vector x by preparing the vector sequence $x_k$, vector sequences $r_k$ and $p_k$, and scalar sequences $\alpha_k$ and $\beta_k$, and using recurrence formulae as indicated in an expression (expression 1) in addition to the first or second aspect of the disclosure.

[Expression 1]

$$\left.\begin{array}{l}r_0 = b - Ax_0 \\ p_0 = M^{-1}r_0 \\ \alpha_k = (r_k, M^{-1}r_k)/(p_k, Ap_k) \\ x_{k+1} = x_k + \alpha_k p_k \\ r_{k+1} = r_k - \alpha_k \cdot Ap_k \\ \beta_k = (r_{k+1}, M^{-1}r_{k+1})/(r_k, M^{-1}r_k) \\ p_{k+1} = M^{-1}r_{k+1} + \beta_k p_k\end{array}\right\} \text{Expression 1}$$

In this configuration, the conjugate gradient method is used, thereby reducing a computation amount in one-time iterative computation.

In the calculation device according to a fourth aspect of the disclosure, the iterative method may be a preconditioned MRTR method using a diagonal matrix $M^{-1}$ as the preconditioned matrix, and when a solution vector x of a system of linear equations Ax=b constituted by a known matrix A and a known vector b is derived, the vector sequence $x_k$ may be caused to approximate to the solution vector x by preparing the vector sequence $x_k$, vector sequences $y_k$, $r_k$, $u_k$, and $p_k$, and scalar sequences $\zeta_k$, $\eta_k$, and $\gamma_k$, and using recurrence formulae as indicated in an expression (expression 2), in addition to the first or second aspect of the disclosure.

[Expression 2]

$$\left.\begin{array}{l}r_0 = b - Ax_0 \\ u_0 = M^{-1}r_0 \\ y_0 = -r_0 \\ p_0 = M^{-1}r_0 \\ \zeta_0 = (M^{-1}Au_0, r_0)/(M^{-1}Au_0, Au_0) \\ \eta_0 = 0 \\ \gamma_{k+1} = \zeta_k(M^{-1}Au_k, r_k) \\ x_{k+1} = x_k + \zeta_k p_k \\ y_{k+1} = \eta_k y_k + \zeta_k Au_k \\ r_{k+1} = r_k - y_{k+1} \\ u_{k+1} = M^{-1}r_{k+1} \\ \zeta_{k+1} = \gamma_{k+1}(M^{-1}Au_{k+1}, r_{k+1})/ \\ \left[\gamma_{k+1}(M^{-1}Au_{k+1}, Au_{k+1}) - (M^{-1}Au_{k+1}, y_{k+1})^2\right] \\ \eta_{k+1} = -(M^{-1}Au_{k+1}, r_{k+1})(M^{-1}Au_{k+1}, y_{k+1})/ \\ \left[\gamma_{k+1}(M^{-1}Au_{k+1}, Au_{k+1}) - (M^{-1}Au_{k+1}, y_{k+1})^2\right] \\ p_{k+1} = (\zeta_k/\zeta_{k+1})p_k + u_{k+1}\end{array}\right\} \text{Expression 2}$$

In this configuration, the MRTR method is used. Therefore, a computation amount in one-time iterative computation is larger than that with the conjugate gradient method but the solutions can be derived by the number of times of iteration smaller than that with the conjugate gradient method in many cases. When A is an asymmetric matrix, approximation to the solutions is not guaranteed with the conjugate gradient method. In contrast, even when A is the asymmetric matrix, approximation to the solutions is guaranteed with the MRTR method as long as A is a positive definite matrix. Further, what-is-called round-off error is not easy to be accumulated and, therefore, this configuration is excellent in convergence.

In the calculation device according to a fifth aspect of the disclosure, when a solution vector x of a system of linear equations Ax=b constituted by a known matrix A and a known vector b is derived using a diagonal matrix $M^{-1}$ as the preconditioned matrix, the diagonal matrix $M^{-1}$ may be defined such that all of absolute values of diagonal components of a matrix product $M^{-1}A$ are equal to or larger than 0.9 and equal to or smaller than 1.1 in addition to any one of the first to fourth aspects of the disclosure.

In this configuration, the diagonal matrix $M^{-1}$ defined such that all of the absolute values of the diagonal components of the matrix product $M^{-1}A$ are close to 1, ideally equal to or larger than 0.9 and equal to or smaller than 1.1, is used as the preconditioned matrix. Therefore, the computation amount necessary for the preconditioning is reduced. For example, the diagonal matrix $M^{-1}$ defined such that all of the absolute values of the diagonal components of the matrix product $M^{-1}A$ are 1 is formed by aligning inverses of the diagonal components of A as the diagonal components.

In the calculation device according to a sixth aspect of the disclosure, when a solution vector x of a system of linear equations Ax=b constituted by a known matrix A and a known vector b is derived using a diagonal matrix $M^{-1}$ as the preconditioned matrix, the diagonal matrix $M^{-1}$ may be defined such that all of norms of row vectors constituting a matrix product $M^{-1}A$ are equal to or larger than 0.9 and equal to or smaller than 1.1 in addition to any one of the first to fourth aspects of the disclosure.

In this configuration, the diagonal matrix $M^{-1}$ defined such that all of the norms of the row vectors constituting the matrix product $M^{-1}A$ are equal to or larger than 0.9 and equal to or smaller than 1.1 is used as the preconditioned matrix. Therefore, the computation amount necessary for the preconditioning is reduced. For example, the diagonal matrix $M^{-1}$ defined such that all of the norms of the row vectors constituting the matrix product $M^{-1}A$ are 1 is formed by aligning inverses of the norms of the row vectors constituting A as the diagonal components.

In the calculation device according to a seventh aspect of the disclosure, when a solution vector x of a system of linear equations Ax=b constituted by a known matrix A and a known vector b is derived using a diagonal matrix $M^{-1}$ as the preconditioned matrix, the diagonal matrix $M_1^{-1}$ may be defined such that all of absolute values of diagonal components of a matrix product $M_1^{-1}A$ are equal to or larger than 0.9 and equal to or smaller than 1.1, a diagonal matrix $M_2^{-1}$ be defined such that all of norms of row vectors constituting a matrix product $M_2^{-1}A$ are equal to or larger than 0.9 and equal to or smaller than 1.1, and $mM_1^{-1}+(1-m)M_2^{-1}$ may be computed using an arbitrary complex number m so as to be used as the preconditioned matrix in addition to any one of the first to fourth aspects of the disclosure.

In this configuration, the diagonal matrix $M_1^{-1}$ defined such that all of the absolute values of the diagonal components of the matrix product $M_1^{-1}A$ are equal to or larger than 0.9 and equal to or smaller than 1.1, the diagonal matrix $M_2^{-1}$ defined such that all of the norms of the row vectors constituting the matrix product $M_2^{-1}A$ are equal to or larger than 0.9 and equal to or smaller than 1.1, and $mM_1^{-1}+(1-m)M_2^{-1}$ defined using the arbitrary complex number m, are used as the preconditioned matrix $M^{-1}$. Therefore, the computation amount necessary for the preconditioning is reduced.

According to another aspect of the disclosure, there is provided a program causing respective arithmetic units to execute the arithmetic processings in parallel in accordance with the order of the vector sequence $x_k$ when the calculation device according to any one of the first to seventh aspects of the disclosure is used to execute the iterative computation of causing the vector sequence $x_k$ to approximate to the solutions of the system of linear equations using the preconditioned matrix as the diagonal matrix.

The program having the configuration is executed on a computer so as to derive the solutions of the system of linear equations at a high speed while performing the parallel computation with a simple configuration.

According to another aspect of the disclosure, there is provided a calculation method including causing respective arithmetic units to execute arithmetic processings in parallel in accordance with the order of the vector sequence $x_k$ when the calculation device according to any one of the first to seventh aspects of the disclosure is used to execute the iterative computation of causing the vector sequence $x_k$ to approximate to the solutions of the system of linear equations using the preconditioned matrix as the diagonal matrix.

With the calculation method having the configuration, the solutions of the system of linear equations are derived at a high speed while the parallel computation is performed with a simple configuration.

With the configuration according to the first aspect of the disclosure, there is provided a calculation device for deriving solutions of a system of linear equations, which realizes a solution of the system of linear equations using an iterative method belonging to a Krylov subspace method, the device including a plurality of arithmetic units, wherein a vector sequence $x_k$ (k is a natural number containing 0) approximating to the solutions of the system of linear equations is formed by a plurality of components in accordance with an order of the vector sequence $x_k$, and when the vector sequence $x_k$ is divided into a plurality of different regions corresponding to the plurality of components and the respective arithmetic units are caused to execute arithmetic processings corresponding to the plurality of different regions in parallel in iterative computation of causing the vector sequence $x_k$ to approximate to the solutions, a preconditioned matrix that is used in the iterative computation is a diagonal matrix. Therefore, the solutions of the system of linear equations can be computed at a high speed by the parallel computation with a simple configuration.

With the configuration according to the second aspect of the disclosure, the plurality of arithmetic units are a combination of a plurality of cores provided in one multicore CPU, a combination of a plurality of cores provided in one GPU, a combination of a plurality of CPUs, a combination of a plurality of GPUs, a combination of a CPU and a GPU, or a combination of a plurality of computers. Therefore, when the plurality of cores in one CPU or the plurality of cores in one GPU both of which can share a memory are used, time taken for data transfer can be made shorter and high-speed arithmetic operation can be realized. Further, when a parallel arithmetic operation is performed using the plurality of CPUs, the plurality of GPUs, or the plurality of computers, a larger-scale system of equations can be handled and the degree of parallelism can be further increased.

With the configuration according to the third aspect of the disclosure, the iterative method is a preconditioned conjugate gradient method using a diagonal matrix $M^{-1}$ as the preconditioned matrix, and when a solution vector x of a system of linear equations Ax=b constituted by a known matrix A and a known vector b is derived, the vector sequence $x_k$ is caused to approximate to the solution vector x by preparing the vector sequence $x_k$, vector sequences $r_k$ and $p_k$, and scalar sequences $\alpha_k$ and $\beta_k$, and using recurrence formulae as indicated in an expression (expression 1). With this, the computation amount in one-time iterative computation can be reduced.

With the configuration according to the fourth aspect of the disclosure, the iterative method is a preconditioned MRTR method using a diagonal matrix $M^{-1}$ as the preconditioned matrix, and when a solution vector x of a system of linear equations Ax=b constituted by a known matrix A and a known vector b is derived, the vector sequence $x_k$ is caused to approximate to the solution vector x by preparing the vector sequence $x_k$, vector sequences $y_k$, $r_k$, $u_k$, and $p_k$, and scalar sequences $\zeta_k$, $\eta_k$, and $y_k$, and using recurrence formulae as indicated in an expression (expression 2). With this, although the computation amount in one-time iterative computation is larger than that with the conjugate gradient method, the solutions can be derived by the number of times of iteration smaller than that with the conjugate gradient method. When A is an asymmetric matrix, approximation to the solutions is not guaranteed with the conjugate gradient method. In contrast, even when A is the asymmetric matrix, approximation to the solutions is guaranteed with the MRTR method as long as A is a positive definite matrix. Further, what-is-called round-off error is not easy to be accumulated and this configuration is excellent in convergence.

With the configuration according to the fifth aspect of the disclosure, when a solution vector x of a system of linear equations Ax=b constituted by a known matrix A and a known vector b is derived using a diagonal matrix $M^{-1}$ as the preconditioned matrix, the diagonal matrix $M^{-1}$ is defined such that all of absolute values of diagonal components of a matrix product $M^{-1}A$ are equal to or larger than 0.9 and equal to or smaller than 1.1. Therefore, the computation amount necessary for the preconditioning can be reduced.

With the configuration according to the sixth aspect of the disclosure, when a solution vector x of a system of linear equations Ax=b constituted by a known matrix A and a known vector b is derived using a diagonal matrix $M^{-1}$ as the preconditioned matrix, the diagonal matrix $M^{-1}$ is defined such that all of norms of row vectors constituting a matrix product $M^{-1}A$ are equal to or larger than 0.9 and equal to or smaller than 1.1. Therefore, the computation amount necessary for the preconditioning can be reduced.

With the configuration according to another aspect of the disclosure, there is provided a program causing each of the plurality of arithmetic units to execute the arithmetic processing in parallel in accordance with the order of the vector sequence $x_k$ when the calculation device according to any one of the first to seventh aspects of the disclosure is used to execute the iterative computation of causing the vector sequence $x_k$ to approximate to the solutions of the system of linear equations using the preconditioned matrix as the diagonal matrix. The program having the configuration is executed on a computer so as to derive the solutions of the system of linear equations at a high speed while performing the parallel computation with a simple configuration.

With the configuration according to another aspect of the disclosure, there is provided a calculation method including causing each of the plurality of arithmetic units to execute the arithmetic processing in parallel in accordance with the order of the vector sequence $x_k$ when the calculation device according to any one of the first to seventh aspects of the disclosure is used to execute the iterative computation of causing the vector sequence $x_k$ to approximate to the solutions of the system of linear equations using the preconditioned matrix as the diagonal matrix. With this method, the solutions of the system of linear equations can be derived at a high speed while the parallel computation is performed with a simple configuration.

DESCRIPTION OF EMBODIMENTS

Hereinafter, a calculation device and a calculation method for deriving solutions of a system of linear equations according to an embodiment of the disclosure, and a program that is applied thereto will be described in detail with reference to the accompanying drawings appropriately.

[Configuration of Calculation Device]

First, a calculation device for deriving solutions of a system of linear equations in the embodiment and various modifications thereof will be described in detail with reference to FIG. 1 to FIG. 4.

Figure 1:
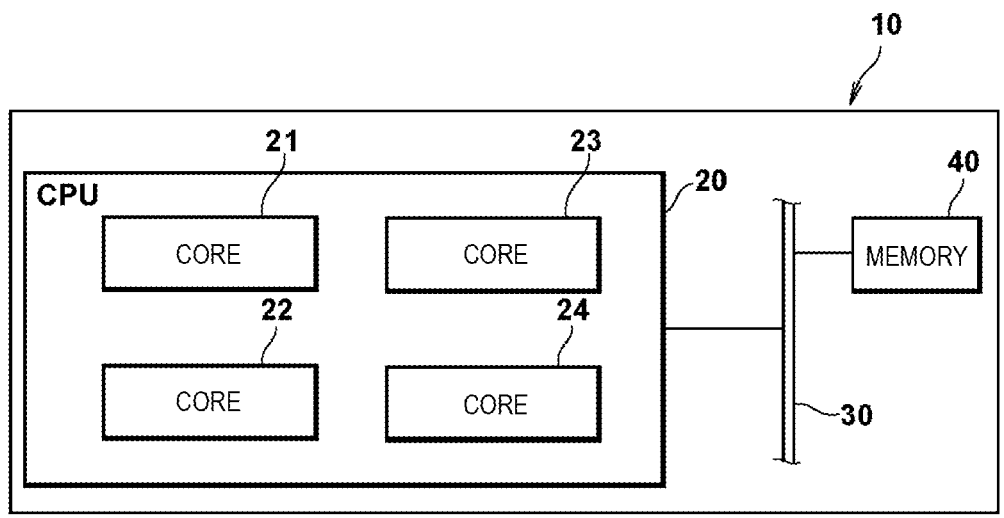
FIG. 1 is a block diagram illustrating the configuration of a calculation device for deriving solutions of a system of linear equations according to an embodiment of the disclosure.
Figure 2:
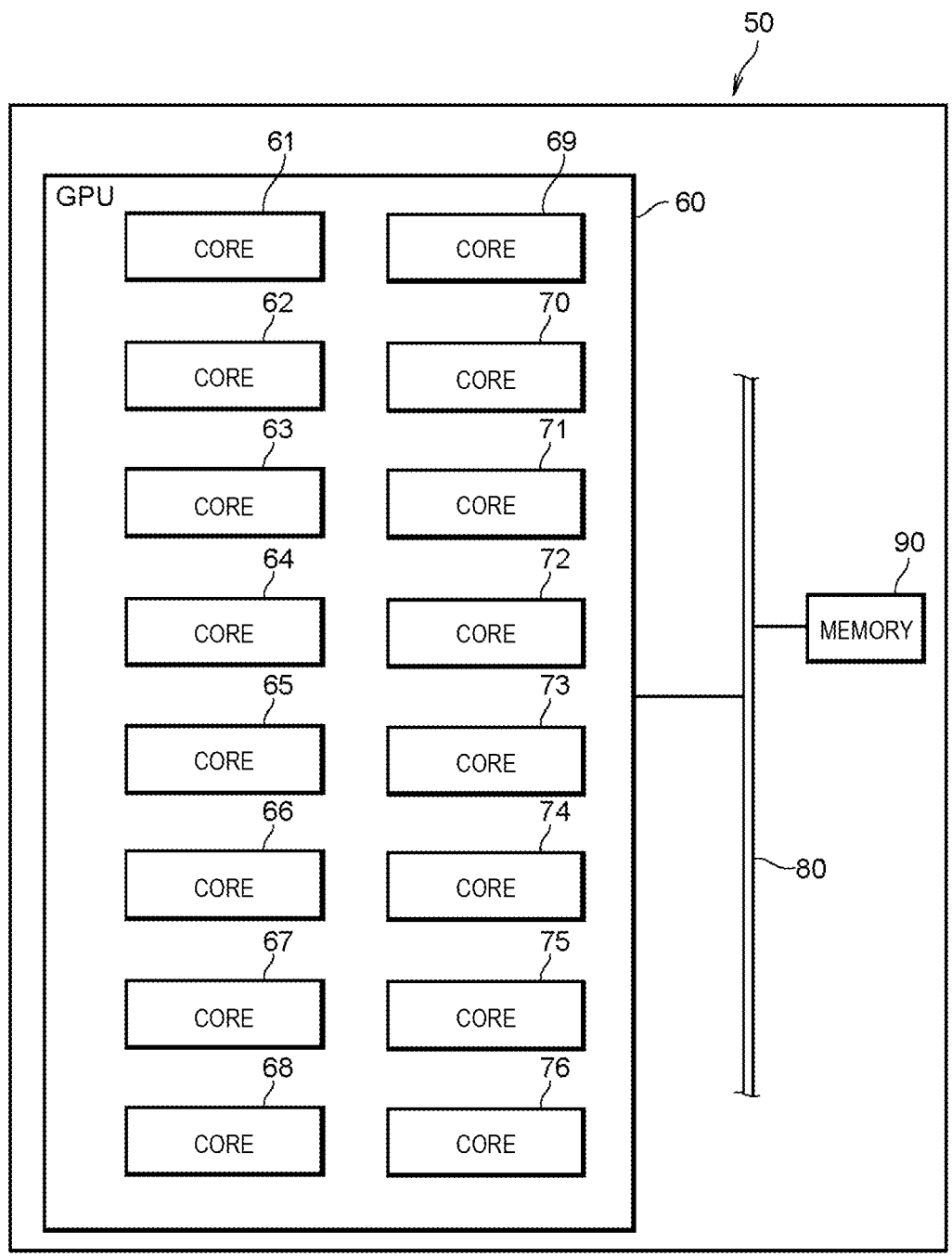
FIG. 2 is a block diagram illustrating the configuration of a calculation device for deriving solutions of a system of linear equations according to a modification of the embodiment.
Figure 3:
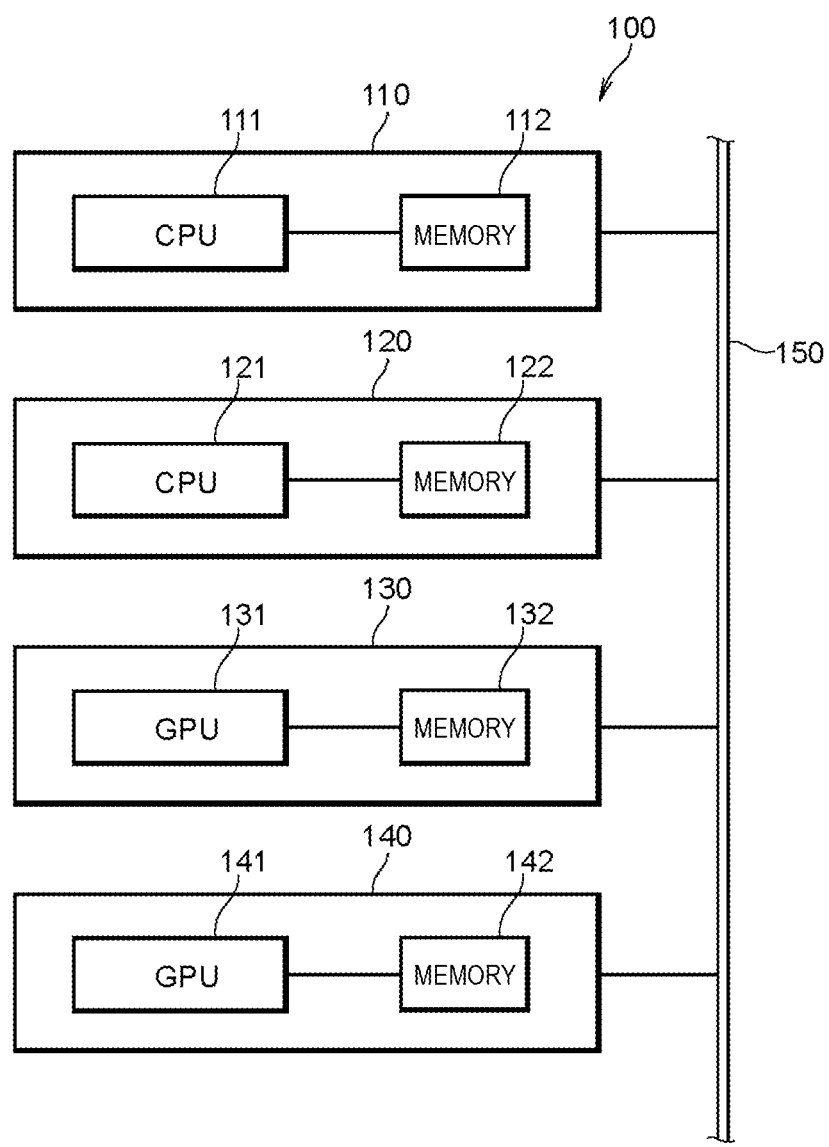
FIG. 3 is a block diagram illustrating the configuration of a calculation device for deriving solutions of a system of linear equations according to another modification of the embodiment.
Figure 4:
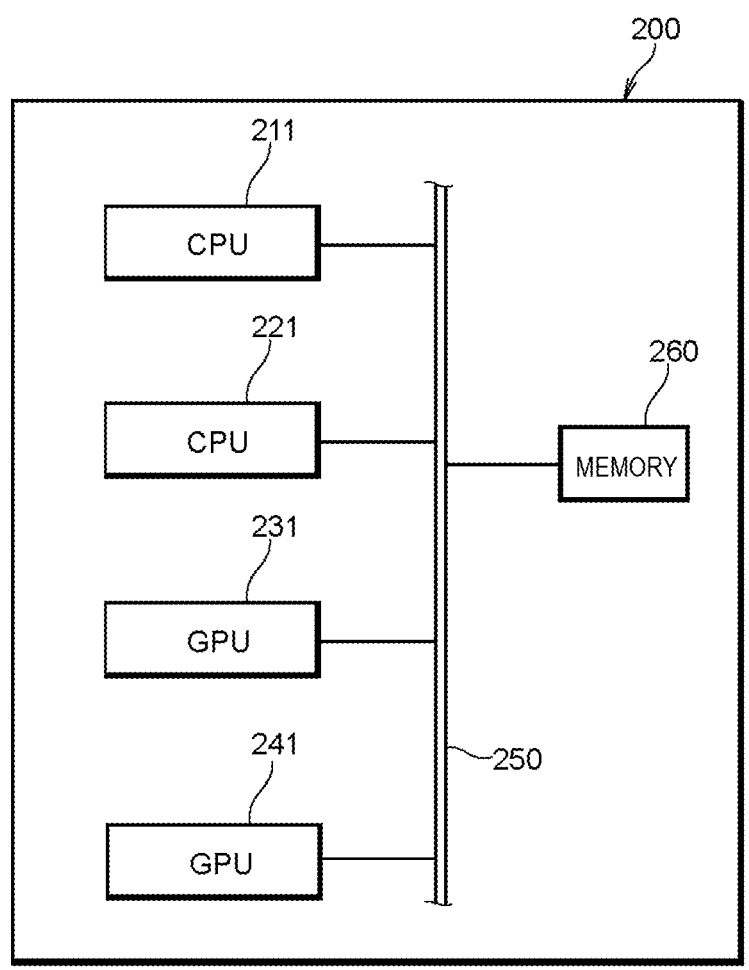
FIG. 4 is a block diagram illustrating the configuration of a calculation device for deriving solutions of a system of linear equations according to still another modification of the embodiment.

FIG. 1 is a block diagram illustrating the configuration of the calculation device for deriving the solutions of the system of linear equations in the embodiment. FIG. 2 is a block diagram illustrating the configuration of a calculation device for deriving solutions of a system of linear equations according to a modification of the embodiment. FIG. 3 is a block diagram illustrating the configuration of a calculation device for deriving solutions of a system of linear equations according to another modification of the embodiment. FIG. 4 is a block diagram illustrating the configuration of a calculation device for deriving solutions of a system of linear equations according to still another modification of the embodiment.

As illustrated in FIG. 1, the calculation device for deriving solutions of a system of linear equations in the embodiment includes a computer 10.

The computer 10 includes a CPU 20 incorporating cores 21 to 24, a communication bus 30 that is electrically connected to the CPU 20, and a memory 40 that is electrically connected to the communication bus 30.

Each of the cores 21 to 24 is an arithmetic unit capable of executing arithmetic processing in parallel in order to execute computation of the solutions of the system of linear equations. Four cores 21 to 24 in total as examples of commercial products are illustrated as a plurality of cores but the total number thereof is not limiting and it is sufficient that a plurality of cores are provided in principle.

The memory 40 stores therein a program having an algorithm for causing the cores 21 to 24 to execute the arithmetic processings in parallel in order to cause them to execute the computation of the solutions of the system of linear equations. The memory 40 is electrically connected to the cores 21 to 24 in the CPU 20 through the communication bus 30. Only one memory 40 is illustrated here but the total number thereof is not limiting and a plurality of memories may be provided. The memory 40 is typically a non-volatile memory.

Thus, the calculation device using the computer 10 including the CPU 20 incorporating the cores 21 to 24 in the embodiment can use the plurality of cores 21 to 24 in the CPU 20 as the plurality of arithmetic units to cause them to execute the computation of the solutions of the system of linear equations in parallel and enables the memory 40 to be shared. With this, time taken for data transfer through the communication bus 30 can be made shorter and it is said that the calculation device is advantageous to the high-speed arithmetic operation.

[Configuration of Calculation Device in Various Modifications]

The calculation device for deriving the solution of the system of linear equations in the embodiment causes the plurality of arithmetic units to execute the arithmetic processings in parallel when computing the solutions of the system of linear equations. Therefore, various modifications thereof can be considered.

The modifications of the calculation device for deriving the solutions of the system of linear equations as illustrated in FIG. 2 to FIG. 4 are included.

First, as illustrated in FIG. 2, a calculation device for deriving solutions of a system of linear equations in the modification of the embodiment includes a computer 50.

The computer 50 includes a GPU 60 incorporating cores 61 to 76, a communication bus 80 that is electrically connected to the GPU 60, and a memory 90 that is electrically connected to the communication bus 80.

Also in the GPU 60, each of the cores 61 to 76 is an arithmetic unit capable of executing arithmetic processing in parallel in order to execute computation of the solutions of the system of linear equations. Sixteen cores 61 to 76 in total as examples of commercial products are illustrated as a plurality of cores but the total number thereof is not limiting and it is sufficient that a plurality of cores are provided in principle.

The memory 90 stores therein a program having an algorithm for causing the cores 61 to 76 to execute the arithmetic processings in parallel in order to cause them to execute the computation of the solutions of the system of linear equations. The memory 90 is electrically connected to the cores 61 to 76 in the GPU 60 through the communication bus 80. Only one memory 90 is illustrated here but the total number thereof is not limiting and a plurality of memories may be provided. The memory 90 is typically a non-volatile memory.

Thus, the calculation device using the computer 50 including the GPU 60 incorporating the cores 61 to 76 in the modification can also use the plurality of cores 61 to 76 in the same GPU 60 as the plurality of arithmetic units so as to cause them to execute the computation of the solutions of the system of linear equations in parallel and enables the memory 90 to be shared. With this, time taken for data transfer through the communication bus 80 can be made shorter and it is said that the calculation device is advantageous to the high-speed arithmetic operation. Further, in general, the number of cores incorporated in the GPU is larger than the number of cores incorporated in the CPU. Therefore, the calculation device including the GPU 60 in the modification is more expensive than the calculation device including the CPU 20 in the embodiment as illustrated in FIG. 1 but can increase the number of arithmetic processings that can be performed in parallel. Therefore, the calculation device including the GPU 60 in the modification is more advantageous to the high-speed arithmetic operation.

Next, as illustrated in FIG. 3, a calculation device for deriving solutions of a system of linear equations in another modification of the embodiment includes a computer group 100 in which computers 110, 120, 130, and 140 are made to link with one another.

The computer 110 includes a CPU 111 incorporating a plurality of cores (not illustrated) and a memory 112 that is electrically connected to the CPU 111 through a communication bus (not illustrated). The configuration of the CPU 111 is the same as that of the CPU 20 in the embodiment as illustrated in FIG. 1. Note that in the modification, the plurality of computers are used as arithmetic units and the number of cores incorporated in the CPU 111 may be one.

The computer 120 includes a CPU 121 incorporating a plurality of cores (not illustrated) and a memory 122 that is electrically connected to the CPU 121 through a communication bus (not illustrated). The configuration of the computer 120 is the same as that of the computer 110.

The computer 130 includes a GPU 131 incorporating a plurality of cores (not illustrated) and a memory 132 that is electrically connected to the GPU 131 through a communication bus (not illustrated). The configuration of the GPU 131 is the same as that of the GPU 60 in the modification as illustrated in FIG. 2. This configuration is also the same as that of the computer 140 including a GPU 141 and a memory 142 that is electrically connected to GPU 141 through a communication bus (not illustrated).

Each of the computers 110, 120, 130, and 140 is an arithmetic unit capable of executing arithmetic processing in parallel in order to execute computation of the solutions of the system of linear equations. Four computers 110, 120, 130, and 140 in total are illustrated as the plurality of computers, as an example, but the total number thereof is not limiting and it is sufficient that a plurality of computers are provided in principle. Further, the plurality of computers may be configured only by computers incorporating the CPUs only or may be configured only by computers incorporating the GPUs only.

The configuration of each of the memories 112 and 122 is the same as that of the memory 40 in the embodiment as illustrated in FIG. 1 and the configuration of each of the memories 132 and 142 is the same as that of the memory 90 in the modification as illustrated in FIG. 2. It is sufficient that the memory storing therein a program having an algorithm for causing the computers 110, 120, 130, and 140 to execute the arithmetic processings in parallel in order to cause them to execute the computation of the solutions of the system of linear equations is set to any of the memories 112, 122, 132, and 142. In this case, it is sufficient that the computer storing therein the program serves as a master and controls remaining computers as slaves, and the computers 110, 120, 130, and 140 are made to link to execute the arithmetic processings in parallel as a whole.

The computers 110, 120, 130, and 140 are electrically connected to a communication network 150 and transmit and receive necessary signals to one another through the communication network 150. The communication network 150 is typically configured by a local area network (LAN), the Internet network, or a combination thereof. When a memory (not illustrated) is electrically connected to the communication network 150, the program having the algorithm for causing the computers to execute the arithmetic processings in parallel in order to cause them to execute the computation of the solutions of the system of linear equations may be stored in the memory.

Thus, the calculation device using the computer group 100 in which the computers 110, 120, 130, and 140 are made to link with one another in the modification can use the plurality of computers 110, 120, 130, and 140 that are electrically connected to the communication network 150 as the plurality of arithmetic units so as to cause them to execute the computation of the solutions of the system of linear equations in parallel. Further, arithmetic processing capability of each arithmetic unit can be significantly increased and the parallelism of the arithmetic units can be enhanced more extensionally. Therefore, computation of the solutions of a larger-scale system of linear equations can be handled.

Next, as illustrated in FIG. 4, a calculation device for deriving solutions of a system of linear equations in still another modification of the embodiment includes a computer 200.

The computer 200 includes CPUs 211 and 221, GPUs 231 and 241, a communication bus 250 that is electrically connected to the CPUs 211 and 221 and the GPUs 231 and 241, and a memory 260 that is electrically connected to the communication bus 250.

The configuration of each of the CPUs 211 and 221 is the same as that of the CPU 20 in the embodiment as illustrated in FIG. 1. Note that in the modification, the plurality of CPUs and the like are used as the arithmetic units and the number of cores incorporated in the CPUs 211 and 221 may be therefore one.

The configuration of each of the GPUs 231 and 241 is the same as that of the GPU 60 in the modification as illustrated in FIG. 2.

In the computer 200, each of the CPUs 211 and 221 and the GPUs 231 and 241 is an arithmetic unit capable of executing arithmetic processing in parallel in order to execute computation of the solutions of the system of linear equations. The two CPUs and the two GPUs are illustrated as the plurality of arithmetic units, as an example, but the number thereof is not limiting and it is sufficient that the plurality of arithmetic units in total are provided in principle. Further, the computer 200 may incorporate the CPUs only or the GPUs only.

The memory 260 stores therein a program having an algorithm for causing the CPUs 211 and 221 and the GPUs 231 and 241 to execute arithmetic processings in parallel in order to cause them to execute the computation of the solutions of the system of linear equations. The memory 260 is electrically connected to the CPUs 211 and 221 and the GPUs 231 and 241 through the communication bus 250. The configuration of the memory 260 is the same as that of the memory 40 in the embodiment as illustrated in FIG. 1 or that of the memory 90 in the modification as illustrated in FIG. 2.

Thus, the calculation device using the computer 200 incorporating the CPUs 211 and 221 and the GPUs 231 and 241 in the same computer 200 in the modification can use the plurality of CPUs 211 and 221 and GPUs 231 and 241 as the plurality of arithmetic units so as to cause them to execute the computation of the solutions of the system of linear equations in parallel. Further, arithmetic processing capability of each arithmetic unit can be significantly increased in a mode using no external communication network. Therefore, computation of solutions of a larger-scale system of linear equations can be handled. However, in the modification, the configuration of an operation system (OS) operating the CPUs 211 and 221 and the GPUs 231 and 241 is complicated and the degree of freedom for selection as commercial products is limited.

[Contents of Program that is Applied to Calculation Device]

Next, a program that is applied to the calculation device for deriving solutions of a system of linear equations in the embodiment including various modifications will be described in detail. The program is stored in a memory of the calculation device for deriving the solutions of the system of linear equations in the embodiment including the various modifications, and then, is read out and executed if necessary. Further, in a calculation method for deriving solutions of a system of linear equations in the embodiment, the program is executed using the calculation device for deriving the solutions of the system of linear equations in the embodiment including the various modifications.

A solution that is used in computation processing by the calculation device for deriving the solutions of the system of linear equations in the embodiment, which uses the plurality of cores 21 to 24 in the same CPU 20, the plurality of cores 61 to 76 in the same GPU 60, the plurality of computer 110, 120, 130, and 140 that are electrically connected to the communication network 150, the CPUs 211 and 221 and the GPUs 231 and 241 in the same computer 200 as described above as the plurality of arithmetic units to cause them to execute the computation of the solutions of the system of linear equations in parallel, is the iterative method belonging to the Krylov subspace method.

To be specific, in the iterative method belonging to the Krylov subspace method, a preconditioned matrix is used in iterative computation of causing a vector sequence $x_k$ (k is a natural number containing 0) to approximate to the solutions of the system of linear equations as solution finding equations.

In the embodiment including the various modifications, in order to cause the plurality of arithmetic units to execute the computation of the solutions of the system of linear equations in parallel, the preconditioned matrix that is used in the iterative computation is set to a diagonal matrix.

The preconditioned matrix is set to the diagonal matrix as described above. With this, the vector sequence $x_k$ can be divided into a plurality of different regions corresponding to a plurality of components in accordance with the order of the vector sequence $x_k$ and each of the plurality of arithmetic units can be caused to execute the arithmetic processings corresponding to the plurality of different regions in parallel.

Hereinafter, description of the preconditioned matrix and the algorithm using it will be made while the system of linear equations as the solution finding equations is expressed as $Ax=b$. Herein, x is an unknown vector as a solution finding target, A is a known coefficient matrix (value thereof is fixed), and b is a known vector (value thereof is fixed).

$M^{-1}$ that can be used as the preconditioned matrix includes the following.

First, the diagonal matrix $M^{-1}$ defined such that all of absolute values of diagonal components of a matrix product $M^{-1}A$ are close to 1, ideally equal to or larger than 0.9 and equal to or smaller than 1.1 is considered. For example, the diagonal matrix $M^{-1}$ defined such that all of the absolute values of the diagonal components of the matrix product $M^{-1}A$ are 1 can be formed by aligning inverses of the diagonal components of A as the diagonal components.

Subsequently, the diagonal matrix $M^{-1}$ defined such that all of norms of row vectors constituting a matrix product $M^{-1}A$ are equal to or larger than 0.9 and equal to or smaller than 1.1 is considered. For example, the diagonal matrix $M^{-1}$ defined such that all of the norms of the row vectors constituting the matrix product $M^{-1}A$ are 1 can be formed by aligning inverses of the norms of the row vectors constituting A as the diagonal components.

As another diagonal matrix $M^{-1}$ that can be used as the preconditioned matrix, the following $M^{-1}$ is obtained by combining the above two examples. That is, considered is $M^{-1}$ formed so as to satisfy $M^{-1}=mM_1^{-1}+(1-m)M_2^{-1}$ using an arbitrary complex number m while the diagonal matrix $M_1^{-1}$ is defined such that all of the absolute values of the diagonal components of the matrix product $M_1^{-1}A$ are equal to or larger than 0.9 and equal to or smaller than 1.1 and the diagonal matrix $M_2^{-1}$ is defined such that all of the norms of the row vectors constituting the matrix product $M_2^{-1}A$ are equal to or larger than 0.9 and equal to or smaller than 1.1.

Although some examples of the diagonal matrix $M^{-1}$ that can be used as the preconditioned matrix have been described above, a preferable diagonal matrix $M^{-1}$ cannot be definitely determined because it depends on given linear equations. In any of the cases, an extremely large effect that the number of times of iteration can be reduced can be provided in comparison with the case where the preconditioning is not performed.

It should be noted that the method in which the diagonal matrix is set as the preconditioned matrix in the embodiment including the various modifications requires the larger number of times of iteration to derive the solutions in comparison with the conventional method using a result of the incomplete LU factorization as the preconditioned matrix in many cases. That is to say, the method in which the diagonal matrix is used as the preconditioned matrix is inferior to the conventional method using the incomplete LU factorization in many cases in terms of reduction in the number of times of iteration.

However, with the method in which the diagonal matrix is used as the preconditioned matrix, the computation amount necessary for the preconditioning is reduced in comparison with the conventional method using the incomplete LU factorization. Therefore, even when the number of times of iteration is increased, the total computation amount required to derive the solutions is not so increased or is reduced. In addition, the method in which the diagonal matrix is used as the preconditioned matrix can make parallelization of the iterative computation efficiently, so that computation time itself taken to derive the solutions can be largely shortened.

As the algorithm of the iterative method using the diagonal matrix as the preconditioned matrix, in principle, it is sufficient that when the iterative computation of causing the vector sequence $x_k$ to approximate to the solutions of the system of linear equations $Ax=b$ as the solution finding equations is executed while the method belonging to the Krylov subspace method is arbitrarily selected, the vector sequence $x_k$ is divided into the plurality of different regions corresponding to the plurality of components in accordance with the order of the vector sequence $x_k$ and the respective arithmetic units are caused to execute the arithmetic processings corresponding to the plurality of different regions in parallel.

Examples of the method belonging to the Krylov subspace method include a conjugate gradient method, a conjugate residual method, a bi-conjugate gradient method, a squared conjugate gradient method, a generalized conjugate residual method, a generalized minimal residual method, and a MRTR method and the like.

Among them, in particular, the conjugate gradient method with a small computation amount in one-time iterative computation can be cited as a preferable method. The conjugate gradient method is a method in which the vector sequence $x_k$ is caused to approximate to a solution vector by preparing vector sequences $x_k$, $r_k$, and $p_k$ and scalar sequences $\alpha_k$ and $\beta_k$ and using recurrence formulae as indicated in an expression (expression 3). In the expression (expression 3), when the diagonal matrix $M^{-1}$ as the preconditioned matrix is made to act on the vector sequence, a term of $\alpha_k p_k$ in a right side of an equation of $x_{k+1}$ is computed from an equation of $\alpha_k$ and the like. Therefore, for example, under an assumption that the order of the vector sequence $r_k$ is n (natural number) when $M^{-1}r_k$ in computation of $\eta_k$ is focused, a first component of $M^{-1}r_k$ is derived as a product of a diagonal first component of $M^{-1}$ and a first component of $r_k$, a second component of $M^{-1}r_k$ is derived as a product of a diagonal second component of $M^{-1}$ and a second component of $r_k$, a third component of $M^{-1}r_k$ is derived as a product of a diagonal third component of $M^{-1}$ and a third component of $r_k$ . . . , and an nth component of $M^{-1}r_k$ is derived as a product of a diagonal nth component of $M^{-1}$ and a nth component of $r_k$. Further, for example, when the number of the plurality of arithmetic units is n, the arithmetic processings with the highest parallelism can be achieved by performing computation of n products in such a manner that each of the n arithmetic units is caused to execute computation of one product. In this case, for example, when the number of the plurality of arithmetic units is smaller than n, some of the plurality of arithmetic units perform the arithmetic operation of the product by a plurality of number of times in the same operation routine loop. In the expression (expression 3), a value of $x_0$ is given as an initial value of the vector sequence.

[Expresssion 3]

$$\left.\begin{aligned}r_0 &= b - Ax_0 \\ p_0 &= M^{-1}r_0 \\ \alpha_k &= (r_k, M^{-1}r_k)/(p_k, Ap_k) \\ x_{k+1} &= x_k + \alpha_k p_k \\ r_{k+1} &= r_k - \alpha_k \cdot Ap_k \\ \beta_k &= (r_{k+1}, M^{-1}r_{k+1})/(r_k, M^{-1}r_k) \\ p_{k+1} &= M^{-1}r_{k+1} + \beta_k p_k\end{aligned}\right\} \quad \text{Expression 3}$$

Further, the MRTR method can be also cited as another example of the algorithm of the iterative method to be used. The MRTR method is a method of causing the vector sequence $x_k$ to approximate to the solution vector by preparing the vector sequences $x_k$, $y_k$, $r_k$, $u_k$, $z_k$, and $p_k$ and the scalar sequences $\zeta_k$, $\eta_k$, and $\gamma_k$, and using recurrence formulae as indicated in an expression (expression 4). In the expression (expression 4), when the diagonal matrix $M^{-1}$ as the preconditioned matrix is made to act on the vector sequence, a term of $\zeta_k p_k$ in a right side of an equation of $x_{k+1}$ is computed from an equation of $M^{-1}Au_k$ and the like. Therefore, for example, under an assumption that the matrix A is an nth-order square matrix and the order of the vector sequence $u_k$ is n (natural number) when $M^{-1}Au_k$ is focused, a first component of $M^{-1}Au_k$ is derived as a product of a diagonal first component of $M^{-1}$ and a first component of $Au_k$, a second component of $M^{-1}Au_k$ is derived as a product of a diagonal second component of $M^{-1}$ and a second component of $Au_k$, a third component of $M^{-1}Au_k$ is derived as a product of a diagonal third component of $M^{-1}$ and a third component of $Au_k$ . . . , and an nth component of $M^{-1}Au_k$ is derived as a product of a diagonal nth component of $M^{-1}$ and a nth component of $Au_k$. Further, for example, when the number of the plurality of arithmetic units is n, the arithmetic processings with the highest parallelism can be achieved by performing computation of n products in such a manner that each of the n arithmetic units is caused to execute computation of one product. In this case, for example, when the number of the plurality of arithmetic units is smaller than n, some of the plurality of arithmetic units perform the arithmetic operation of the product by a plurality of number of times in the same operation routine loop. In the expression (expression 4), values of $x_0$ and $r_0$ are given as initial values of the vector sequence.

[Expression 4]

$$\left.\begin{aligned}r_0 &= b - Ax_0 \\ u_0 &= M^{-1}r_0 \\ y_0 &= -r_0 \\ z_0 &= M^{-1}y_0 \\ p_0 &= M^{-1}r_0 \\ \zeta_0 &= (M^{-1}Au_0, r_0)/(M^{-1}Au_0, Au_0) \\ \eta_0 &= 0 \\ \gamma_{k+1} &= \zeta_k(M^{-1}Au_k, r_k) \\ x_{k+1} &= x_k + \zeta_k p_k \\ y_{k+1} &= \eta_k y_k + \zeta_k Au_k \\ r_{k+1} &= r_k - y_{k+1} \\ z_{k+1} &= \eta_k z_k + \zeta_k(M^{-1}Au_k) \\ u_{k+1} &= u_k - z_{k+1} \\ \zeta_{k+1} &= \gamma_{k+1}(M^{-1}Au_{k+1}, r_{k+1})/ \\ & \quad \left[\gamma_{k+1}(M^{-1}Au_{k+1}, Au_{k+1}) - (M^{-1}Au_{k+1}, y_{k+1})^2\right] \\ \eta_{k+1} &= -(M^{-1}Au_{k+1}, r_{k+1})(M^{-1}Au_{k+1}, y_{k+1})/ \\ & \quad \left[\gamma_{k+1}(M^{-1}Au_{k+1}, Au_{k+1}) - (M^{-1}Au_{k+1}, y_{k+1})^2\right] \\ p_{k+1} &= (\zeta_k/\zeta_{k+1})p_k + u_{k+1}\end{aligned}\right\} \quad \text{Expression 4}$$

The MRTR method requires a larger computation amount in one-time iterative computation than that with the conjugate gradient method but can derive solutions with the number of times of iteration which is smaller than that with the conjugate gradient method in many cases. When A is an asymmetric matrix, approximation to the solutions is not guaranteed with the conjugate gradient method. In contrast, even when A is the asymmetric matrix, approximation to the solutions is guaranteed with the MRTR method as long as A is a positive definite matrix. Whether the conjugate gradient method or the MRTR method is advantageous depends on a target on which the arithmetic processing is performed.

In addition, when the recurrence formulae as indicated in the expression (expression 4) are used, the computation amount in one-time iterative computation can be reduced. However, when the MRTR method is used in the embodiment including the various modifications, recurrence formulae as indicated in an expression (expression 5) are used. In the expression (expression 5), when the diagonal matrix $M^{-1}$ as the preconditioned matrix is made to act on the vector sequence, a term of $\zeta_k p_k$ in a right side of an equation of $x_{k+1}$ is computed from an equation of $M^{-1}Au_k$ and the like. Therefore, for example, under an assumption that the matrix A is the nth-order square matrix and the order of the vector sequence $u_k$ is n (natural number) when $M^{-1}Au_k$ is focused, a first component of $M^{-1}Au_k$ is derived as a product of a diagonal first component of $M^{-1}$ and a first component of $Au_k$, a second component of $M^{-1}Au_k$ is derived as a product of a diagonal second component of $M^{-1}$ and a second component of $Au_k$, a third component of $M^{-1}Au_k$ is derived as a product of a diagonal third component of $M^{-1}$ and a third component of $Au_k$ . . . , and an nth component of $M^{-1}Au_k$ is derived as a product of a diagonal nth component of $M^{-1}$ and a nth component of $Au_k$. Further, for example, when the number of the plurality of arithmetic units is n, computation of n products can be performed by causing each of the n arithmetic units to execute computation of one product. This achieves the arithmetic processings with the highest parallelism. In this case, for example, when the number of the plurality of arithmetic units is smaller than n, some of the plurality of arithmetic units perform the arithmetic operation of the product by a plurality of number of times in the same operation routine loop. In the expression (expression 5), values of $x_0$ and $r_0$ are initial values of the vector sequence.

[Expression 5]

$$\left.\begin{aligned}
r_0 &= b - Ax_0 \\
u_0 &= M^{-1}r_0 \\
y_0 &= -r_0 \\
p_0 &= M^{-1}r_0 \\
\zeta_0 &= (M^{-1}Au_0, r_0)/(M^{-1}Au_0, Au_0) \\
\eta_0 &= 0 \\
\gamma_{k+1} &= \zeta_k(M^{-1}Au_k, r_k) \\
x_{k+1} &= x_k + \zeta_k p_k \\
y_{k+1} &= \eta_k y_k + \zeta_k Au_k \\
r_{k+1} &= r_k - y_{k+1} \\
u_{k+1} &= M^{-1}r_{k+1} \\
\zeta_{k+1} &= \gamma_{k+1}(M^{-1}Au_{k+1}, r_{k+1})/ \\
&\quad [\gamma_{k+1}(M^{-1}Au_{k+1}, Au_{k+1}) - (M^{-1}Au_{k+1}, y_{k+1})^2] \\
\eta_{k+1} &= -(M^{-1}Au_{k+1}, r_{k+1})(M^{-1}Au_{k+1}, y_{k+1})/ \\
&\quad [\gamma_{k+1}(M^{-1}Au_{k+1}, Au_{k+1}) - (M^{-1}Au_{k+1}, y_{k+1})^2] \\
p_{k+1} &= (\zeta_k/\zeta_{k+1})p_k + u_{k+1}
\end{aligned}\right\} \quad \text{Expression 5}$$

When compared with the recurrence formulae as indicated in the expression (expression 4), the recurrence formulae as indicated in the expression (expression 5) do not contain the vector sequence $z_k$ and an equation of deriving $u_{k+1}$ is different. As for portions other than the vector sequence $z_k$, these recurrence formulae are mathematically the same values and can be deduced from one side to the other side. When the recurrence formulae are applied to computation of actual numerical values using a computer, behavior on accumulation of what-is-called round-off error is different.

As a consequence, the round-off error is not easy to be accumulated and the convergence is excellent when the recurrence formulae as indicated in the expression (expression 5) are used. When both of them are compared, in the recurrence formulae as indicated in the expression (expression 5), the vector sequence $u_k$ is redefined by an original definition formula $u_k = M^{-1}r_k$ each time whereas in the recurrence formulae as indicated in the expression (expression 4), $u_{k+1}$ is deduced by primary coupling to simple $z_{k+1}$ while avoiding the definition formula $u_k = M^{-1}r_k$. In other words, the recurrence formulae as indicated in the expression (expression 4) receive accumulated round-off error by the iterative computation while avoiding an action of $M^{-1}$ once. When L and U obtained by the incomplete LU factorization are used as the action of $M^{-1}$, that is, the preconditioning, avoiding of the action of $M^{-1}$ once using the former recurrence formulae is advantageous because the computation amount of the action of $M^{-1}$ is large. However, when $M^{-1}$ is made to act by simple product computation between the preconditioned vector and each component as in the embodiment including the various modifications, there is no advantage in reception of the accumulated round-off error while avoiding the action of $M^{-1}$ once. Accordingly, when the MRTR method is used in the embodiment including the various modifications, the recurrence formulae as indicated in the expression (expression 5) are used.

COMPUTATION EXAMPLE 1

Hereinafter, a solution finding arithmetic result of simulation by the finite element method performed using the calculation device for deriving the solutions of the system of linear equations in the embodiment will be described.

Figure 5:
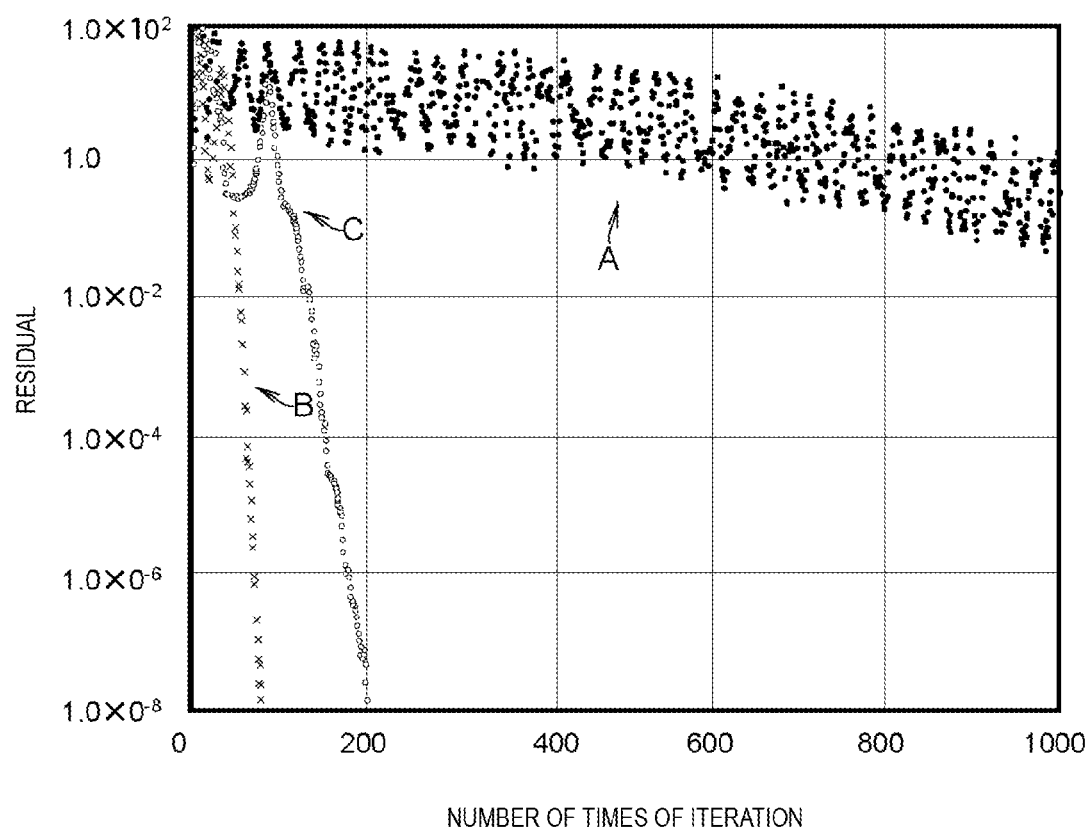
FIG. 5 is a graph illustrating a solution finding arithmetic result of simulation by a finite element method performed using the calculation device for deriving the solutions of the system of linear equations in the embodiment together with a comparison example, the horizontal axis indicating the number of times of iteration and the longitudinal axis indicating residuals.

FIG. 5 is a graph illustrating a solution finding arithmetic result of simulation by the finite element method performed using the calculation device of the solutions of the system of linear equations in the embodiment together with a comparison example, the horizontal axis indicating the number of times of iteration and the longitudinal axis indicating residual.

In the computation example, the residual is an amount that is defined by $|b-Ax_k|/|b|$ and indicates the degree of difference of $x_k$ from the solution. In general, computation is terminated when the magnitude of the residual is $1\times10^{-8}$. The conjugate gradient method was used as the algorithm of the iterative computation.

In FIG. 5, data when the preconditioning was not performed is indicated by A, data when $U^{-1}L^{-1}$ obtained by the incomplete LU factorization was used as the preconditioned matrix is indicated by B, and data when the diagonal matrix $M^{-1}$ defined such that all of the norms of the row vectors constituting the matrix product $M^{-1}A$ were 1 was used as the preconditioned matrix using the recurrence formulae of the expression (expression 3) is indicated by C.

As illustrated in FIG. 5, the data C requires the number of times of iteration to derive the solutions, which is approximately 2.5 times as large as that of the data B.

However, the computation amount when the preconditioned matrix is made to act on the vector is largely different between the data B and the data C. Therefore, the data C requires a computation amount in one-time iterative computation, which is approximately 1/2.5 of that of the data B. Accordingly, the computation amount of the data C required to derive the solutions is substantially the same as that of the data B.

In the computation step of making the preconditioned matrix act on the vector, it is difficult to perform parallelization with the computation algorithm corresponding to the case where the data B is obtained whereas it is easy to perform parallelization with the computation algorithm corresponding to the case where the data C is obtained. Therefore, in a state where the parallel computation is performed, computation time is significantly shorter in the case where the data C is obtained than that of the case where the data B is obtained.

On the other hand, in the case where the preconditioning is not performed as indicated by the data A, the number of times of iteration required to derive the solutions becomes too large. It is needless to say that when the preconditioning is not performed, the parallel computation is performed easily and the computation amount in the one-time iterative computation is small. However, in this case, the computation amount in the one-time iterative computation is approximate 90% (decreased by approximately 10%) of that in the case where the data C is obtained and the parallelization efficiency in the parallel computation is not so different from that in the case where the data C is obtained.

Therefore, comprehensively, when the conjugate gradient method is used as the algorithm of the iterative computation, the case, which corresponds to the data C, where the diagonal matrix $M^{-1}$ defined such that all of the norms of the row vectors constituting the matrix product $M^{-1}A$ are 1 is used as the preconditioned matrix using the recurrence formulae of the expression (expression 3) and the parallel computation is executed in the computation step of making the preconditioned matrix act on the vector, enables the highest-speed computation to be realized among the above-mentioned three cases.

COMPUTATION EXAMPLE 2

Next, another solution finding arithmetic result of simulation by the finite element method performed using the calculation device of the solutions of the system of linear equations in the embodiment will be described.

Figure 6:
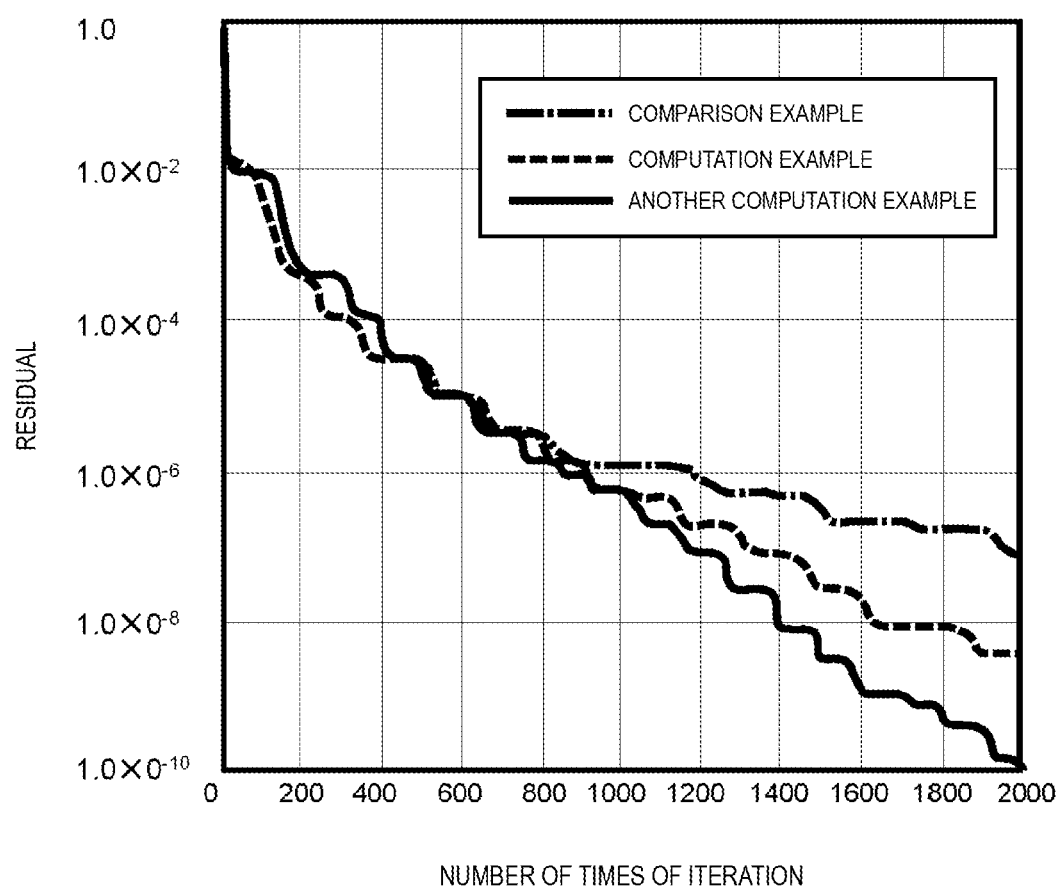
FIG. 6 is a graph illustrating another solution finding arithmetic result of simulation by the finite element method performed using the calculation device for deriving the solutions of the system of linear equations in the embodiment together with a comparison example, the horizontal axis indicating the number of times of iteration and the longitudinal axis indicating residuals.

FIG. 6 is a graph illustrating another solution finding arithmetic result of simulation by the finite element method performed using the calculation device for deriving the solutions of the system of linear equations in the embodiment together with a comparison example, the horizontal axis indicating the number of times of iteration and the longitudinal axis indicating residuals.

In the computation example, the MRTR method was used as the algorithm of the iterative computation. The residual is an amount that is defined by $|b-Ax_k|/|b|$ as in the computation example 1.

In FIG. 6, data indicated as the comparison example are a result of using $U^{-1}L^{-1}$ obtained from the incomplete LU factorization as the preconditioned matrix. Further, both of the data indicated as the computation example and another computation example are data obtained by using the diagonal matrix $M^{-1}$ defined such that all of the norms of the row vectors constituting the matrix product $M^{-1}A$ are 1 as the preconditioned matrix. However, among them, the recurrence formulae that are used are different between the computation example and another computation example and the former uses the above-mentioned recurrence formulae in the expression (expression 4) and the latter uses the above-mentioned recurrence formulae in the expression (expression 5).

As illustrated in FIG. 6, the number of times of iteration in the computation example is reduced to be smaller than the number of times of iteration in the comparison example but the solutions are not derived in FIG. 6 in the computation example. On the other hand, in another computation example, the number of times of iteration is reduced to be the smallest and can be evaluated that the solutions are substantially derived in FIG. 6.

Therefore, when the MRTR method is used as the algorithm of the iterative computation, the case where the diagonal matrix $M^{-1}$ defined such that all of the norms of the row vectors constituting the matrix product $M^{-1}A$ are 1 is used as the preconditioned matrix using the recurrence formulae in the expression (expression 5) and the parallel computation is executed in the computation step of making the preconditioned matrix act on the vector enables the highest-speed computation to be realized among the above-mentioned three cases.

With the configurations of the calculation device of the solutions of the system of linear equations in the embodiment including the above-mentioned various modifications, the calculation method that is used therefor, and the program that is applied thereto, solutions of the system of linear equations can be computed at a high speed by the parallel computation with a simple configuration.

It is needless to say that in the disclosure, the shapes, the arrangement, the number, and the like of constituent components are not limited to those in the above-mentioned embodiment and can be appropriately changed in a range without necessarily departing from the scope of the disclosure including appropriate replacement of the constituent components by those providing equivalent action effects.

INDUSTRIAL APPLICABILITY

As described above, according to the present disclosure, a calculation device and a calculation method for deriving solutions of a system of linear equations, which are capable of realizing a high-speed solution of the system of linear equations by the parallel computation, and a program that is applied thereto can be provided with a simple configuration. Therefore, it is expected that the disclosure can be widely applied to the fields in which the industrial mathematics is applied, such as simulation devices, using general-purpose and universal characteristics.

The invention claimed is:

1. A calculation device for deriving solutions of a system of linear equations, which realizes a solution of the system of linear equations using an iterative method belonging to a Krylov subspace method, the device comprising:
   a plurality of arithmetic units, wherein
   a vector sequence $x_k$, where k is a natural number containing 0, approximating to the solution of the system of linear equations comprises a plurality of components in accordance with an order of the vector sequence $x_k$,
   when the vector sequence $x_k$ is divided into a plurality of different regions corresponding to the plurality of components and each of the plurality of arithmetic units are caused to execute arithmetic processings corresponding to the plurality of different regions in parallel in iterative computation of causing the vector sequence $x_k$ to approximate to the solutions, a preconditioned matrix that is used in the iterative computation is a diagonal matrix,
   the plurality of arithmetic units are a combination of a plurality of cores provided in one multicore CPU, a combination of a plurality of cores provided in one GPU, a combination of a plurality of CPUs, a combination of a plurality of GPUs, a combination of a CPU and a GPU, or a combination of a plurality of computers,
   the iterative method is a preconditioned conjugate gradient method using a diagonal matrix $M^{-1}$ as the preconditioned matrix, and
   when a solution vector x of a system of linear equations Ax=b constituted by a known matrix A and a known vector b is derived, the vector sequence $x_k$ is caused to approximate to the solution vector x by preparing the vector sequence $x_k$, vector sequences $r_k$ and $p_k$, and scalar sequences $\alpha_k$ and $\beta_k$, using recurrence formulae as indicated in expression 1:

$$\left. \begin{array}{l} r_0 = b - Ax_0 \\ p_0 = M^{-1}r_0 \\ \alpha_k = (r_k, M^{-1}r_k)/(p_k, Ap_k) \\ x_{k+1} = x_k + \alpha_k p_k \\ r_{k+1} = r_k - \alpha_k \cdot Ap_k \\ \beta_k = (r_{k+1}, M^{-1}r_{k+1})/(r_k, M^{-1}r_k) \\ p_{k+1} = M^{-1}r_{k+1} + \beta_k p_k \end{array} \right\}.$$ Expression 1

2. The calculation device according to claim 1,
   wherein the iterative method is a preconditioned MRTR method using a diagonal matrix $M^{-1}$ as the preconditioned matrix, and when a solution vector x of a system of linear equations Ax=b constituted by a known matrix A and a known vector b is derived, the vector sequence $x_k$ is caused to approximate to the solution vector x by preparing the vector sequence $x_k$, vector sequences $y_k$, $r_k$, $u_k$, and $p_k$, and scalar sequences $\zeta_k$, $\eta_k$, and $\gamma_k$, and using recurrence formulae as indicated in expression 2:

$$\left.\begin{aligned}
r_0 &= b - Ax_0 \\
u_0 &= M^{-1}r_0 \\
y_0 &= -r_0 \\
p_0 &= M^{-1}r_0 \\
\zeta_0 &= (M^{-1}Au_0, r_0)/(M^{-1}Au_0, Au_0) \\
\eta_0 &= 0 \\
\gamma_{k+1} &= \zeta_k(M^{-1}Au_k, r_k) \\
x_{k+1} &= x_k + \zeta_k p_k \\
y_{k+1} &= \eta_k y_k + \zeta_k Au_k \\
r_{k+1} &= r_k - y_{k+1} \\
u_{k+1} &= M^{-1}r_{k+1} \\
\zeta_{k+1} &= \gamma_{k+1}(M^{-1}Au_{k+1}, r_{k+1})/ \\
&\quad \left[\gamma_{k+1}(M^{-1}Au_{k+1}, Au_{k+1}) - (M^{-1}Au_{k+1}, y_{k+1})^2\right] \\
\eta_{k+1} &= -(M^{-1}Au_{k+1}, r_{k+1})(M^{-1}Au_{k+1}, y_{k+1})/ \\
&\quad \left[\gamma_{k+1}(M^{-1}Au_{k+1}, Au_{k+1}) - (M^{-1}Au_{k+1}, y_{k+1})^2\right] \\
p_{k+1} &= (\zeta_k/\zeta_{k+1})p_k + u_{k+1}
\end{aligned}\right\} \quad \text{Expression 2}$$

3. The calculation device according to claim 1, wherein when a solution vector x of a system of linear equations Ax=b constituted by a known matrix A and a known vector b is derived using a diagonal matrix $M^{-1}$ as the preconditioned matrix, the diagonal matrix $M^{-1}$ is defined such that all of absolute values of diagonal components of a matrix product $M^{-1}A$ are equal to or larger than 0.9 and equal to or smaller than 1.1.

4. The calculation device according to claim 1, wherein when a solution vector x of a system of linear equations Ax=b constituted by a known matrix A and a known vector b is derived using a diagonal matrix $M^{-1}$ as the preconditioned matrix, the diagonal matrix $M^{-1}$ is defined such that all of norms of row vectors constituting a matrix product $M^{-1}A$ are equal to or larger than 0.9 and equal to or smaller than 1.1.

5. The calculation device according to claim 1, wherein when a solution vector x of a system of linear equations Ax=b constituted by a known matrix A and a known vector b is derived using a diagonal matrix $M^{-1}$ as the preconditioned matrix, the diagonal matrix $M_1^{-1}$ is defined such that all of absolute values of diagonal components of a matrix product $M_1^{-1}A$ are equal to or larger than 0.9 and equal to or smaller than 1.1, a diagonal matrix $M_2^{-1}$ is defined such that all of norms of row vectors constituting a matrix product $M_2^{-1}A$ are equal to or larger than 0.9 and equal to or smaller than 1.1, and $mM_1^{-1}+(1-m)M_2^{-1}$ is computed using an arbitrary complex number m so as to be used as the preconditioned matrix.

6. A program causing each of the plurality of respective arithmetic units to execute arithmetic processings corresponding to the plurality of different regions in a vector sequence $x_k$ in parallel when the calculation device according to claim 1 is used to execute the iterative computation of causing the vector sequence $x_k$ to approximate to the solutions of the system of linear equations using the preconditioned matrix as the diagonal matrix.

7. A calculation method including causing each of the plurality of respective arithmetic units to execute arithmetic processings corresponding to the plurality of different regions in a vector sequence $x_k$ in parallel when the calculation device according to claim 1 is used to execute the iterative computation of causing the vector sequence $x_k$ to approximate to the solutions of the system of linear equations using the preconditioned matrix as the diagonal matrix.

8. The calculation device according to claim 1 further comprising a communication bus and a memory storing a program having an algorithm for causing the plurality of arithmetic units to execute the computation of the solution of the system of linear equations, the memory being electrically connected to the plurality of arithmetic units through the communication bus.

* * * * *

UNITED STATES PATENT AND TRADEMARK OFFICE
CERTIFICATE OF CORRECTION

PATENT NO. : 9,727,529 B2
APPLICATION NO. : 14/748420
DATED : August 8, 2017
INVENTOR(S) : Teruhisa Shibahara It is certified that error appears in the above-identified patent and that said Letters Patent is hereby corrected as shown below:

In the Specification

Column 5, Line 61, "$M_2^{\ 1}$" should read -- $M_2^{-1}$ --

Signed and Sealed this
Twelfth Day of December, 2017

Joseph Matal
*Performing the Functions and Duties of the
Under Secretary of Commerce for Intellectual Property and
Director of the United States Patent and Trademark Office*